US011468592B2

(12) United States Patent
Sato

(10) Patent No.: US 11,468,592 B2
(45) Date of Patent: Oct. 11, 2022

(54) INFORMATION PROCESSING APPARATUS AND INFORMATION PROCESSING METHOD

(71) Applicant: SONY CORPORATION, Tokyo (JP)

(72) Inventor: Tatsuhito Sato, Kanagawa (JP)

(73) Assignee: SONY CORPORATION, Tokyo (JP)

(*) Notice: Subject to any disclaimer, the term of this patent is extended or adjusted under 35 U.S.C. 154(b) by 50 days.

(21) Appl. No.: 16/489,552

(22) PCT Filed: Mar. 19, 2018

(86) PCT No.: PCT/JP2018/010703
§ 371 (c)(1),
(2) Date: Aug. 28, 2019

(87) PCT Pub. No.: WO2018/180666
PCT Pub. Date: Oct. 4, 2018

(65) Prior Publication Data
US 2020/0051273 A1    Feb. 13, 2020

(30) Foreign Application Priority Data

Mar. 30, 2017  (JP) .............................. JP2017-067321

(51) Int. Cl.
*G06T 7/73*   (2017.01)
*G06V 40/16*  (2022.01)

(52) U.S. Cl.
CPC .............. *G06T 7/73* (2017.01); *G06V 40/161* (2022.01); *G06V 40/168* (2022.01); *G06V 40/172* (2022.01); *G06T 2207/30201* (2013.01)

(58) Field of Classification Search
CPC ............ G06T 7/73; G06T 2207/30201; G06K 9/00228; G06K 9/00268
See application file for complete search history.

(56) References Cited

U.S. PATENT DOCUMENTS 10,558,846 B2 *  2/2020  Yamaoka .......... G06K 9/00926
2011/0091113 A1 * 4/2011  Ito ..................... G06K 9/00315
                                                          382/197

(Continued)

FOREIGN PATENT DOCUMENTS

JP        4595750 B2     12/2010
JP     2013-195377 A      9/2013

(Continued)

OTHER PUBLICATIONS

International Search Report and Written Opinion of PCT Application No. PCT/JP2018/010703, dated Jun. 26, 2018, 08 pages of ISRWO.

(Continued)

*Primary Examiner* — Ruiping Li
(74) *Attorney, Agent, or Firm* — Chip Law Group

(57) ABSTRACT

There is provided an information processing apparatus capable of improving an identification accuracy for a user. The information processing apparatus according to the present technology includes a control unit. The control unit causes, when a user is unable to be identified by identification in a feature quantity space based on a registered feature quantity and an acquired feature quantity of the user, the acquired feature quantity of the user to be stored in a storage unit as an unidentifiable feature quantity, sets an additional registration feature quantity on the basis of a distribution of unidentifiable feature quantities in the feature quantity space, specifies a user corresponding to the additional registration feature quantity, and additionally registers the additional registration feature quantity as a feature quantity of the specified user.

18 Claims, 10 Drawing Sheets

(56) References Cited

U.S. PATENT DOCUMENTS

2017/0357845 A1  12/2017 Yamaoka et al.
2019/0080155 A1* 3/2019 Ganong ............. G06K 9/00261

FOREIGN PATENT DOCUMENTS

JP          6025690 B2    11/2016
WO      2017/017900 A1    2/2017

OTHER PUBLICATIONS

Office Action for JP Patent Application No. 2019-509328, dated Jan. 2, 2022, 04 pages of English Translation and 04 pages of Office Action.

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/010703 filed on Mar. 19, 2018, which claims priority benefit of Japanese Patent Application No. JP 2017-067321 filed in the Japan Patent Office on Mar. 30, 2017. Each of the above-referenced applications is hereby incorporated herein by reference in its entirety.

TECHNICAL FIELD

The present technology relates to a technology of identifying a user on the basis of a feature quantity of the user acquired from an image or the like.

BACKGROUND ART

In recent years, the technology of identifying a user on the basis of a feature quantity of the user has been widely used as a technology for security check, login restriction, and the like.

In this type of technology, in general, a method of identifying the user by calculating a degree of similarity between a registered feature quantity of the user and a feature quantity of the user at the time of identification is often used (for example, Patent Literature 1).

On the other hand, for example, if the brightness of the face of the user changes due to a lighting environment or the like or if the face of the user changes due to removal or wearing of glasses or a cap or the like, the feature quantity of the user at the time of identification may change from the registered feature quantity of the user. In this case, despite the fact that it is the same person, there is a problem in that the user is unable to be identified accurately, and the identification accuracy is lowered.

The following Patent Literature 2 is disclosed as a technology related to such a problem. In the technology disclosed in Patent Literature 2, the user who has been already newly registered copes with a change in brightness of the face of the user or the like, by requesting additional registration of his/her face on another occasion different from the new registration. Specifically, in the technology disclosed in Patent Literature 2, a degree of coincidence S between the registered face identification data and the feature quantity data at the time of additional registration request is determined, and if the degree of coincidence S is within a predetermined range ($s1 \leq S \leq s1'$), the feature quantity data at the time of additional registration request is additionally registered as face identification data corresponding to the user.

CITATION LIST

Patent Literature

Patent Literature 1: Japanese Patent No. 4595750
Patent Literature 2: Japanese Patent No. 6025690

DISCLOSURE OF INVENTION

Technical Problem

In the technology disclosed in Patent Literature 2, the additional registration is performed when there is a small change between the face when the registered face identification data is acquired and the face when the feature quantity data is acquired at the time of additional registration request, but when there is a large change between the two faces, the additional registration is not performed even though it is the same person. Therefore, in the technology disclosed in Patent Literature 2, there is still a problem in that the identification accuracy for the user is low.

In light of the foregoing, it is an object of the present technology to provide a technology capable of improving the identification accuracy for the user.

Solution to Problem

In order to achieve the above object, an information processing apparatus according to the present technology includes a control unit. The control unit causes, when a user is unable to be identified by identification in a feature quantity space based on a registered feature quantity and an acquired feature quantity of the user, the acquired feature quantity of the user to be stored in a storage unit as an unidentifiable feature quantity, sets an additional registration feature quantity on the basis of a distribution of unidentifiable feature quantities in the feature quantity space, specifies a user corresponding to the additional registration feature quantity, and additionally registers the additional registration feature quantity as a feature quantity of the specified user.

In the information processing apparatus, the additional registration feature quantity is set on the basis of the distribution of unidentifiable feature quantities. Since the additional registration feature quantity is set on the basis of the distribution as described above, it is possible to set the additional registration feature quantity suitable for improving the identification accuracy for the user. As a result, the identification accuracy for the user can be improved.

In the information processing apparatus, the control unit may specify an area in which the unidentifiable feature quantities are gathered in the feature quantity space on the basis of the distribution and set the additional registration feature quantity in the area.

Accordingly, it is possible to set the additional registration feature quantity which is more suitable for improving the identification accuracy for the user.

In the information processing apparatus, the control unit may perform an interaction with the user and specify the user corresponding to the additional registration feature quantity.

Accordingly, it is possible for the user to additionally register the additional registration feature quantity as the feature quantity of the user by performing a simple interaction.

In the information processing apparatus, the control unit may determine a density of the unidentifiable feature quantity in the feature quantity space, and specify the area in accordance with the density.

In the information processing apparatus, the control unit may determine, as the density, the number of other unidentifiable feature quantities located in a range within a first distance with respect to a certain specific unidentifiable feature quantity.

In the information processing apparatus, the control unit may specify the range within the first distance from the certain specific unidentifiable feature quantity if the density is equal to or larger than a predetermined threshold value.

In the information processing apparatus, the control unit may set the certain specific unidentifiable feature quantity as the additional registration feature quantity.

In the information processing apparatus, the control unit may determine whether or not the interaction is started on the basis of a distance between the additional registration feature quantity and the acquired feature quantity of the user.

In the information processing apparatus, the control unit may start the interaction if the distance between the additional registration feature quantity and the acquired feature quantity of the user is equal to or less than a second distance.

In the information processing apparatus, the control unit may specify an area in which the unidentifiable feature quantities are gathered in the feature quantity space on the basis of the distribution and set the additional registration feature quantity in the area. In this case, the area may be a range in which a distance from the additional registration feature quantity is within a first distance, and the second distance may be equal to or less than the first distance.

In the information processing apparatus, the control unit may cause a voice of a conversation with the user to be output from an audio output unit and interact with the user.

In the information processing apparatus, the control unit may cause a voice of a question for the user to be output from the audio output unit and perform the interaction with the user.

In the information processing apparatus, the control unit may be able to change a question format in the voice of the question.

In the information processing apparatus, the control unit may change the question format in accordance with a distance between the additional registration feature quantity and the registered feature quantity.

In the information processing apparatus, the control unit may determine whether or not the distance between the additional registration feature quantity and the registered feature quantity is equal to or less than a third distance, and cause a voice in a first question format for asking the user if the user is the user corresponding to the registered feature quantity to be output from the audio output unit if the distance is equal to or less than the third distance.

In the information processing apparatus, the control unit may cause a voice in a second question format for asking the user to answer a name of the user to be output from the audio output unit if the distance exceeds the third distance.

In the information processing apparatus, the control unit may determine whether or not the name answered by the user is the user corresponding to the registered feature quantity, and register the additional registration feature quantity as a feature quantity of a new user if the name answered by the user is not the user corresponding to the registered feature quantity.

In the information processing apparatus, the control unit may acquire information of a voice of the user answered to the voice of the conversation output from the audio output unit, execute speaker recognition on the basis of the information of the voice of the user, and specify the user.

An information processing method according to the present technology includes causing, when a user is unable to be identified by identification in a feature quantity space based on a registered feature quantity and an acquired feature quantity of the user, the acquired feature quantity of the user to be stored in a storage unit as an unidentifiable feature quantity, setting an additional registration feature quantity on the basis of a distribution of unidentifiable feature quantities in the feature quantity space, specifying a user corresponding to the additional registration feature quantity, and additionally registering the additional registration feature quantity as a feature quantity of the specified user.

A program according to the present technology causes a computer to execute a step of causing, when a user is unable to be identified by identification in a feature quantity space based on a registered feature quantity and an acquired feature quantity of the user, the acquired feature quantity of the user to be stored in a storage unit as an unidentifiable feature quantity, a step of setting an additional registration feature quantity on the basis of a distribution of unidentifiable feature quantities in the feature quantity space, a step of specifying a user corresponding to the additional registration feature quantity, and a step of additionally registering the additional registration feature quantity as a feature quantity of the specified user.

Advantageous Effects of Invention

As described above, according to the present technology, it is possible to provide a technology capable of improving the identification accuracy for the user.

MODE(S) FOR CARRYING OUT THE INVENTION

Hereinafter, exemplary embodiments of the present technology will be described with reference to the appended drawings.

First Embodiment

Overall Configuration and Configurations of Parts

Figure 1:
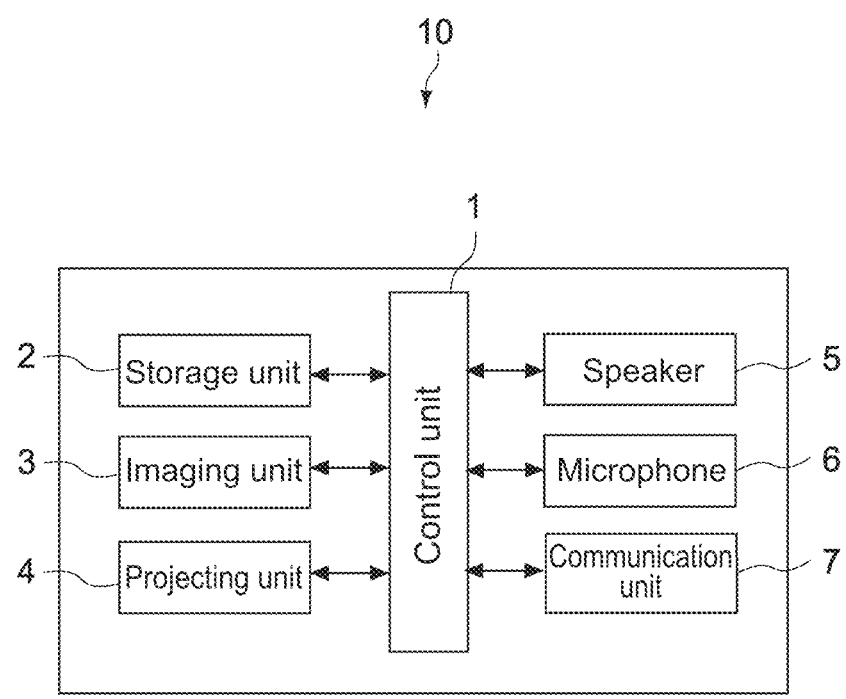
FIG. 1 is a block diagram illustrating a home agent apparatus according to a first embodiment.

FIG. 1 is a block diagram illustrating a home agent apparatus 10 according to a first embodiment.

As illustrated in FIG. 1, the home agent apparatus 10 (information processing apparatus) includes a control unit 1, a storage unit 2, an imaging unit 3, a projecting unit 4, a speaker (audio output unit) 5, a microphone 6, a communication unit 7.

The control unit 1 is constituted by a central processing unit (CPU) or the like. The control unit 1 executes various types of operations on the basis of various types of programs stored in the storage unit 2 and controls the respective parts of the home agent apparatus 10 in an integrated manner. Note that a process of the control unit 1 will be described in detail later in description of an operation.

The storage unit 2 includes a non-volatile memory that stores various types of programs necessary for the process of the control unit 1 and various types of data and a volatile memory used as a work area of the control unit 1. Note that various types of programs stored in the storage unit 2 may be read from a portable recording medium such as an optical disk or a semiconductor memory or may be downloaded from a server apparatus on a network.

The imaging unit 3 includes an imaging element such as a charge coupled device (CCD) sensor or a complementary metal oxide semiconductor (CMOS) sensor and an optical system such as an imaging lens. The imaging unit 3 outputs an image acquired by imaging to the control unit 1.

The projecting unit 4 includes various types of optical systems such as a light source, a prism, a mirror, a condenser lens, a projection lens, and a digital light processing (DLP). The projecting unit 4 generates an image corresponding to an image signal generated by the control unit 1 and projects the image toward a screen, a wall, or the like.

The speaker 5 outputs a sound corresponding to an audio signal generated by the control unit 1. The microphone 6 collects a voice spoken by the user, converts the collected voice into an electrical signal, and outputs it to the control unit 131.

The communication unit 7 is configured to be able to communicate with a server apparatus on a network, a terminal apparatus carried by the user, or the like.

<Description of Operation>

[Basic Process]

Next, how the home agent apparatus 10 is basically used will be described while describing a basic process of home agent apparatus 10.

There are two types of basic processes of the home agent apparatus 10. A first type is a face identification process, and a second type is a process for realizing various functions by an interaction with the user.

First, the face identification process will be described. The face identification process is executed to identify whether or not the user has an access authority to the home agent apparatus 10 or who is a corresponding user if there is a plurality of users having access authority.

For the face identification process, it is necessary for the user to first cause the imaging unit 3 to capture the face of the user and register the face feature quantity of the user in the home agent apparatus 10 in advance. At this time, the control unit 1 executes face detection on the basis of an image captured by the imaging unit 3 and specifies an image of a face part. Then, the control unit 1 detects a face feature position (for example, the eyes, the nose, the mouth, or the like) from the image of the specified face part.

Then, the control unit 1 extracts a face feature quantity (for example, a 256-dimensional face feature quantity vector) from an image near the face feature position, and causes the extracted face feature quantity to be stored in the storage unit 2 in association with a user ID. Accordingly, the face feature quantity of the user is stored in the storage unit 2 as the registered feature quantity.

In the face identification process, the control unit 1 extracts the face feature quantity from the image captured by the imaging unit 3 similarly to the time of face registration. Then, the control unit 1 calculates the similarity distance between the registered feature quantity and the face feature quantity acquired by the extraction at that time in the feature quantity space.

At this time, if the similarity distance is within a predetermined threshold value, the control unit 1 determines that a person shown in the image is a user having the access authority. On the other hand, if the similarity distance exceeds the threshold value, it is determined that the person shown in the image is a person having no access authority. Further, if it is determined that the person shown in the image is the user having the access authority, the control unit 1 reads the user ID associated with the registered feature quantity from the storage unit 2 and identifies the user shown in the image.

As described above, the control unit 1 identifies whether or not the person shown in the image at that time is the user having the access authority to the home agent apparatus 10 or identifies who the user is.

Note that the face identification process is performed at a predetermined cycle (at intervals of about several seconds), and the control unit 1 determines whether or not the user having the access authority is shown in the image and recognizes who the user is at a predetermined cycle (at intervals of about several seconds).

Next, the process of realizing various types of functions by an interaction with the user will be described.

For example, when it is determined that the user having the access authority is shown in the image through the face identification process, the control unit 1 causes various voices to be output from the speaker 5 in accordance with a predetermined condition. For example, the control unit 1 causes the speaker 5 to output a voice "There is a new mail" when there is a new mail for the user. Further, for example, when the user is shown in the image for the first time in the image in that morning, the control unit 1 causes the speaker 5 to output a voice "Do you want me to say schedule for today?."

When the user says "Display new mails" to the voice from the speaker 5, information of the voice is output to the control unit 1 via the microphone 6. In this case, the control unit 1 controls the projecting unit 4 on the basis of the information of the voice of the user acquired from the microphone 6 such that the new mail is projected onto the screen or the like.

Further, when the user says "Say schedule" to the voice of the speaker 5, information of the voice is output to the control unit 1 via the microphone 6. In this case, the control unit 1 converts character information of the schedule of the user into voice information on the basis of the information of the voice of the user acquired from the microphone 6, and causes the speaker 5 to output the voice information.

As described above, the home agent apparatus 10 has various types of functions to make the user' life convenient.

[Face Feature Quantity Addition Registration Process]

Next, a face feature quantity addition registration process will be described. Here, if the face of the user at the time of face recognition changes with respect to the face of the user at the time of face registration, there are cases in which the user is unable to be determined accurately even though it is the same person.

There are the following cases where the face of the user at face identification changes with respect to the face of the user at face registration. Due to the lighting/non-lighting of a light, opening/closing of a curtain, or the like, the face of the user at the time of face identification becomes brighter or darker than the face of the user at the time of face registration. The face of the user at the time of face identification changes with respect to the face of the user at the time of face registration due to removal or waring of glasses or a hat, long and short hairs, a hair style, the presence or absence of eyebrows, the presence or absence of sunburn, or the like. A direction in which the face of the user faces or the facial expression (for example, smiling or sticking tongue out) at the time of face identification is different from a direction in which the face of the user faces or the facial expression at the time of registration.

In the present technology, even though the face of the user at the time of face recognition changes with respect to the face of the user at the time of face registration, the face feature quantity addition registration process is executed so that the user can be identified accurately.

The face feature quantity addition registration process is roughly divided into (1) a "process of storing an unidentifiable face feature quantity," (2) a "process of setting an additional registration face feature quantity," and (3) a "process of additionally registering additional registration face feature quantity."

(1) "Process of Storing Unidentifiable Face Feature Quantity"

Figure 2:
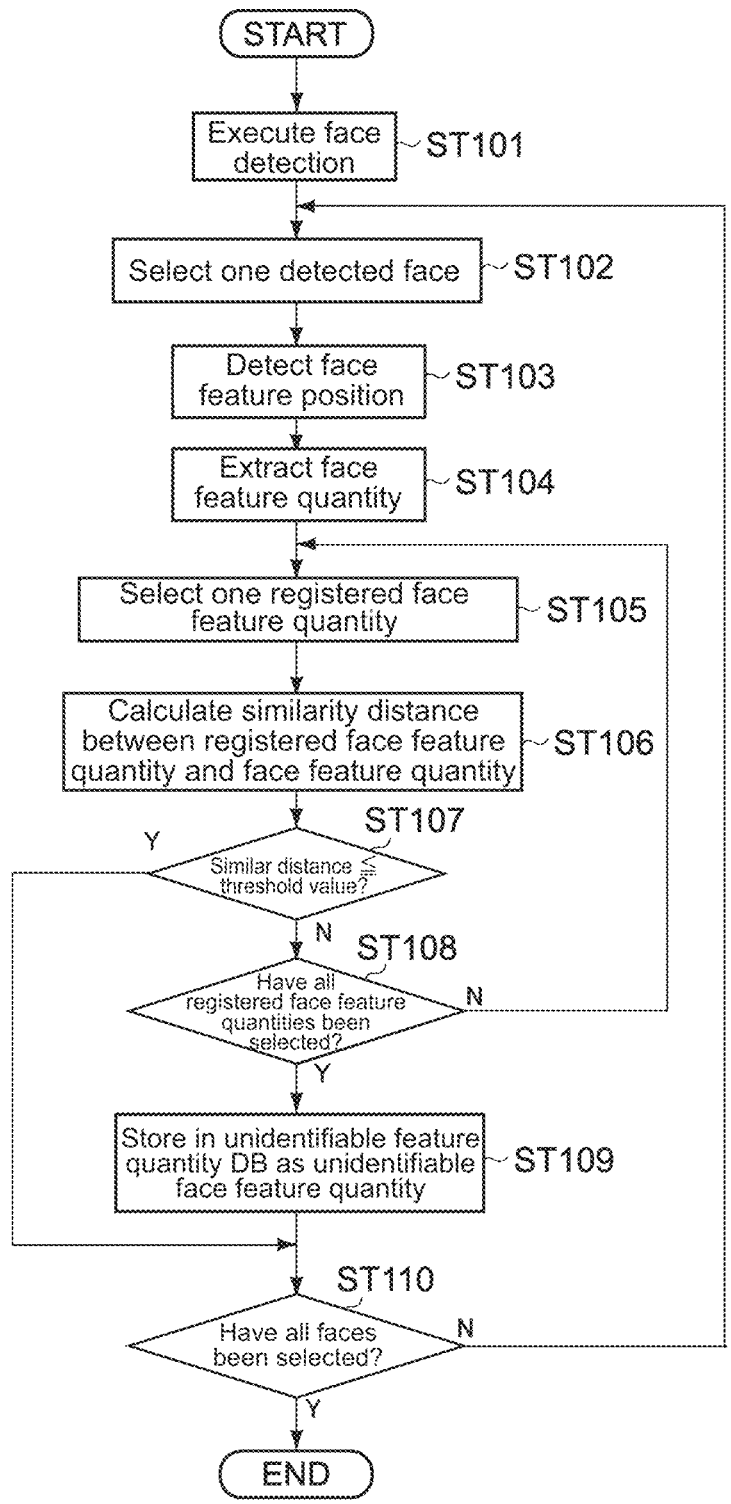
FIG. 2 is a flowchart illustrating a process of storing an unidentifiable face feature quantity.

First, a process of storing an unidentifiable face feature quantity will be described. FIG. 2 is a flowchart illustrating the process of storing the unidentifiable face feature quantity.

First, on the basis of the image captured by the imaging unit 3, the control unit 1 executes face detection and specifies the image of the face part (step 101). Then, the control unit 1 selects an image of a face part corresponding to any one face among faces detected (step 102).

Then, the control unit 1 detects the face feature position (for example, the eyes, the nose, the mouth, or the like) from the selected image of the face part (step 103). Then, the control unit 1 extracts the face feature quantity (for example, the 256-dimensional face feature quantity vector) from the image near the face feature position (step 104).

Then, the control unit 1 selects one face feature quantity among the registered feature quantities (step 105). Then, the control unit 1 calculates the similarity distance between the registered feature quantity and the face feature quantity acquired at that time in the feature quantity space (step 106).

Then, the control unit 1 determines whether or not the similarity distance is equal to or less than a predetermined threshold value (step 107). If the similarity distance exceeds the predetermined threshold value (NO in step 107), that is, if it is determined that the person corresponding to the face feature quantity is not the user corresponding to the registered feature quantity, the control unit 1 proceeds to step 108.

In step 108, the control unit 1 determines whether or not all registered face feature quantities have already been selected. If there is a non-selected registered feature quantity (NO in step 108), the control unit 1 returns to step 105 and selects a registered feature quantity different from the previously selected registered feature quantity, and executes the process starting from step 106 again.

On the other hand, if all the registered feature quantities have been selected (YES in step 108), that is, if the person corresponding to the face feature quantity is unable to be identified, the control unit 1 stores the face feature quantity in an unidentifiable feature quantity database (DB) as an unidentifiable face feature quantity (step 109). At this time, the control unit 1 stores the unidentifiable face feature quantity in the unidentifiable feature quantity DB in association with date information, time information, or the like. Note that unidentifiable feature quantity DB is a DB disposed in the storage unit 2.

If the control unit 1 stores the unidentifiable face feature quantity in the unidentifiable feature quantity DB, it proceeds to next step 110. Similarly, when the similarity distance is equal to or less than a predetermined threshold value in step 107 (YES in step 107), that is, when the person corresponding to the face feature quantity is able to be identified, the control unit 1 skips steps 108 and 109 and proceeds to next step 110.

In step 110, the control unit 1 determines whether or not all the faces detected by the face detection have already been selected. If there is a non-selected face (NO in step 110), the control unit 1 returns to step 102, and executes the process starting from step 102 again.

On the other hand, if all the faces detected by the face detection have already been selected (YES in step 110), the control unit 1 ends the process.

Since the process illustrated in FIG. 2 is repeatedly executed at a predetermined cycle (for example, at intervals of about several seconds), the unidentifiable face feature quantity is sequentially accumulated in the unidentifiable feature quantity DB.

The control unit 1 may delete the unidentifiable face feature quantity from the unidentifiable feature quantity DB when a predetermined period (for example, several weeks to several months) elapses after the unidentifiable face feature quantity is stored in the unidentifiable feature quantity DB. In addition to or instead of this, when the number of unidentifiable face feature quantities recorded in the unidentifiable DB exceeds a predetermined number (for example, several thousands to several hundreds of thousands), the control unit 1 may delete the old unidentifiable face feature quantity from the unidentifiable feature quantity DB and replace it with a new unidentifiable face feature quantity.

Note that, in the storage process of the unidentifiable face feature quantity, the face feature quantity unable to be identified by the face identification process performed in the above-described basic process may be stored in the unidentifiable feature quantity DB, or a process different from the face identification process may be executed.

Figure 3:
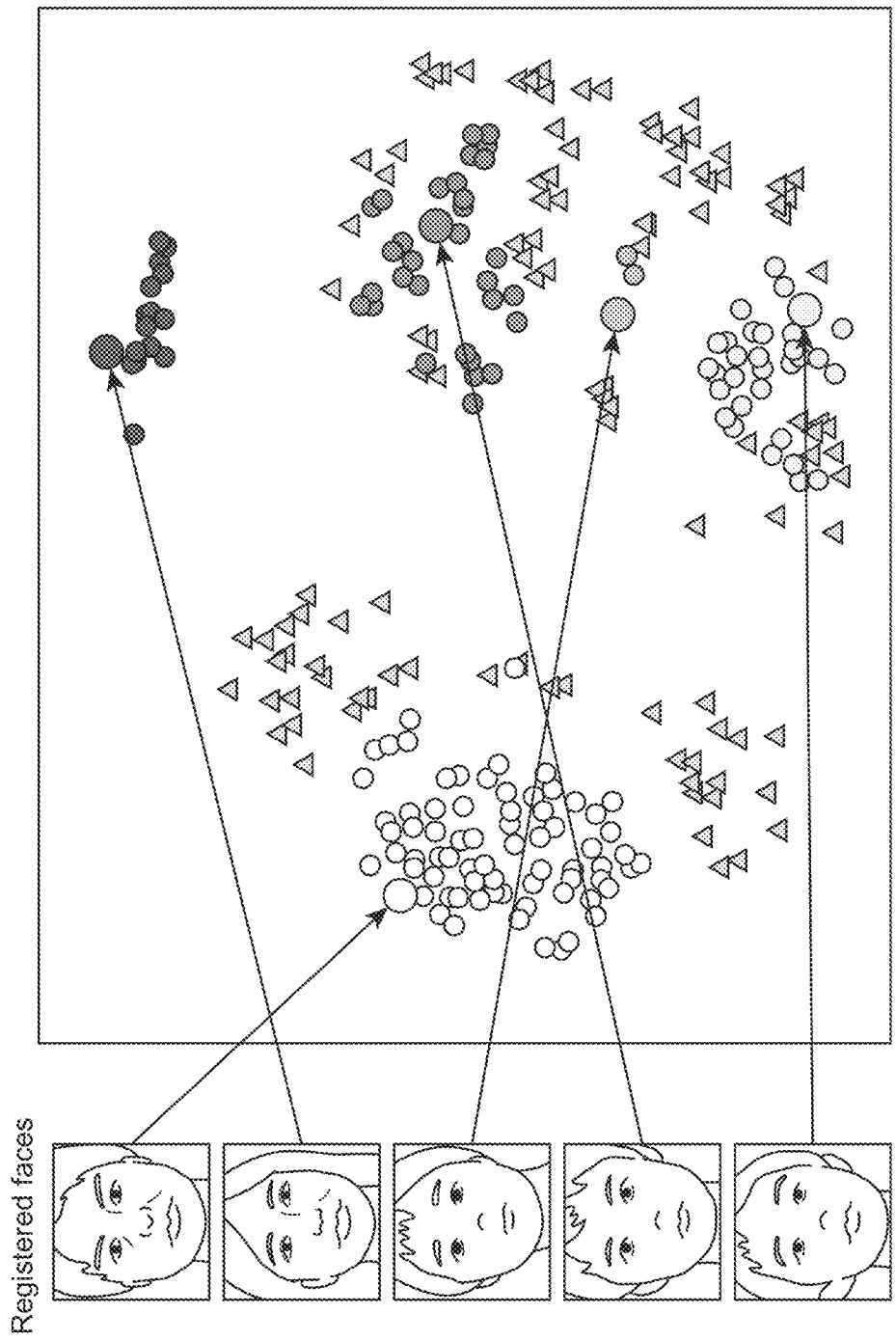
FIG. 3 is a diagram illustrating a state in which the distribution of registered face feature quantities, identifiable face feature quantities, and unidentifiable face feature quantities in a feature quantity space is plotted on a plane.

FIG. 3 is a diagram illustrating a state in which the distribution of the registered face feature quantities, the identifiable face feature quantities, and the unidentifiable face feature quantities in the feature quantity space is plotted on a plane. The identifiable feature quantity is a face feature quantity identified as any one user, and the unidentifiable face feature quantity is a face feature quantity not identified as any user as described above.

The faces of the users (registered faces) at the time of registration which are the source of the registered feature quantity are also illustrated on a left side of FIG. 3, and in the example illustrated in FIG. 3, registered faces of a father, a mother, an eldest son, a second son, and a third son are illustrated in order from the top.

In FIG. 3, a large ○ mark indicates the registered feature quantity, and a small ○ mark indicates the identifiable feature quantity. Further, a Δ mark indicates the unidentifiable face feature quantity. Note that, in FIG. 3, the registered feature quantity (the large ○ mark) and the identifiable feature quantity (the small ○ mark) are displayed with different gray scale densities for each corresponding user.

Note that the distribution illustrated in FIG. 3 is the distribution of the face feature quantities which are acquired in the same environment by the home agent apparatus 10 installed in a living room, a dining room, or the like of a home which family members frequently go in and out.

Here, in the process in FIG. 2 described above, the unidentifiable face feature quantity indicated by the Δ mark in FIG. 3 is sequentially accumulated in the unidentifiable feature quantity DB.

Figure 4:
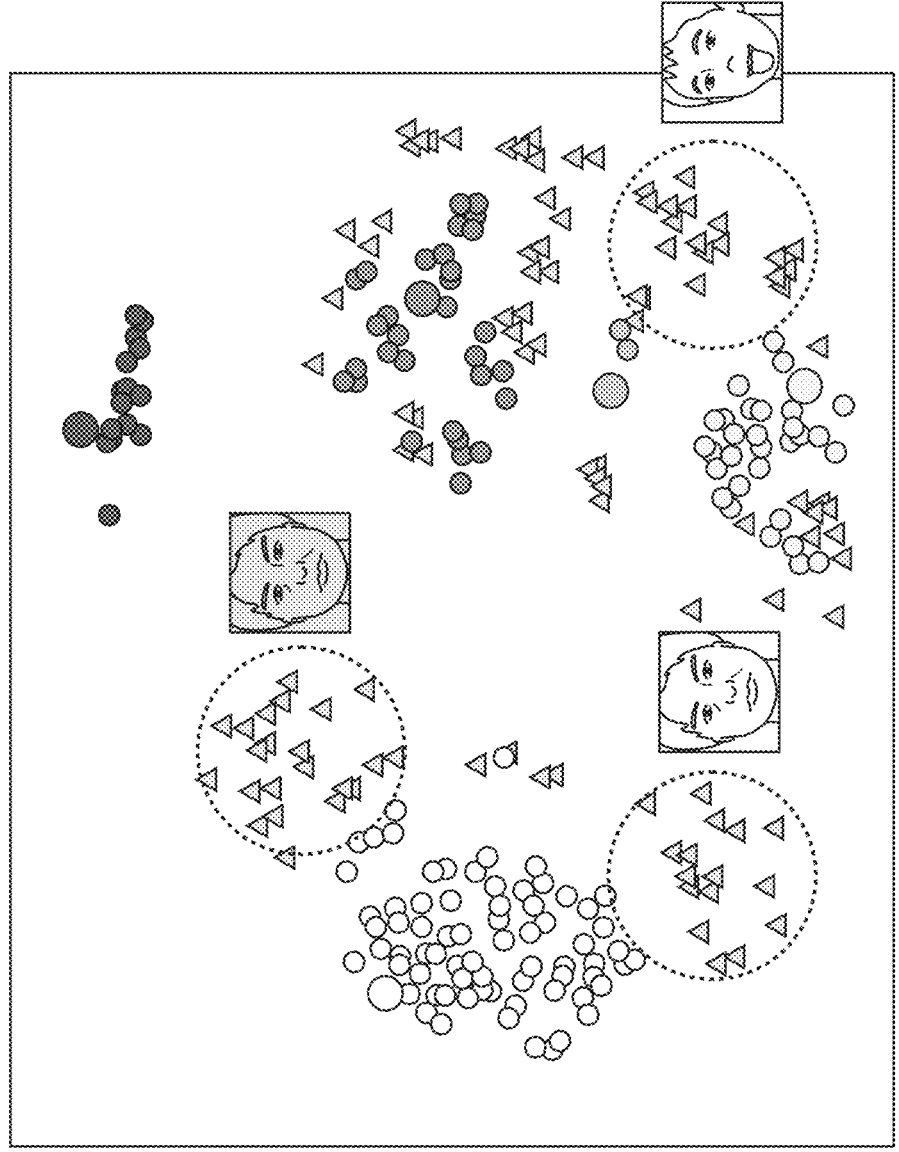
FIG. 4 is a diagram for describing the distribution of unidentifiable face feature quantities.

FIG. 4 is a diagram for describing the distribution of the unidentifiable face feature quantities. Note that the large ○ mark, the small ○ marks, and the Δ marks in FIG. 4 are similar to those in FIG. 3. Note that, in FIG. 4, ○ of a dashed line indicates an area in which the unidentifiable face feature quantities are gathered.

In the example illustrated in FIG. 4, the face feature quantities corresponding to the face of the father because it is dark because the light is not turned on are concentratedly gathered in the upper left area as the unidentifiable face feature quantity. Further, the face feature quantities corresponding to the face of the father because it is bright due to the reason why the curtain is opened are concentratedly gathered in the lower left area as the unidentifiable face feature quantity. Further, the face feature quantities corresponding to the face of the third son when the facial expression changes are concentratedly gathered in the lower right area as an unidentifiable face feature quantity.

As understood from FIGS. 3 and 4, the unidentifiable face feature quantity (see the Δ marks) based on the image of the face captured in the same environment are likely to be concentratedly in a certain area (see ○ of a dashed line) in the feature quantity space. Therefore, if the unidentifiable face feature quantities are accumulated in the unidentifiable feature quantity DB, the pattern of the distribution of the unidentifiable face feature quantities corresponding to the change in the lighting environment, the change in the facial expression, or the like appears in the feature quantity space.

Note that, in the present embodiment, it is necessary to accumulate a certain number of unidentifiable face feature quantities from the images captured in the same environment. Therefore, the home agent apparatus 10 is typically concentratedly installed in a place where the user stays at a high frequency, for example, a living room, a dining room, or the like.

(2) "Process of Setting Additional Registration Face Feature Quantity"

Next, the process of setting the additional registration face feature quantity will be described.

In brief, first, an area (see ○ of the dashed line) in which the unidentifiable face feature quantities are gathered in the feature quantity space is specified on the basis of the distribution of the unidentifiable face feature quantities (see the Δ marks) in the feature quantity space illustrated in FIGS. 3 and 4. In other words, the unidentifiable face feature quantities caused by the change in the lighting environment, the change in the facial expression, or the like is likely to be concentratedly gathered in a certain area, and thus this area is identified.

Further, if the area is specified, the additional registration face feature quantity is set in this area. The additional registration face feature quantity is a face feature quantity which is additionally registered as a face feature quantity of a specific user in the "process of additionally registering the additional registration face feature quantity" later.

Figure 5:
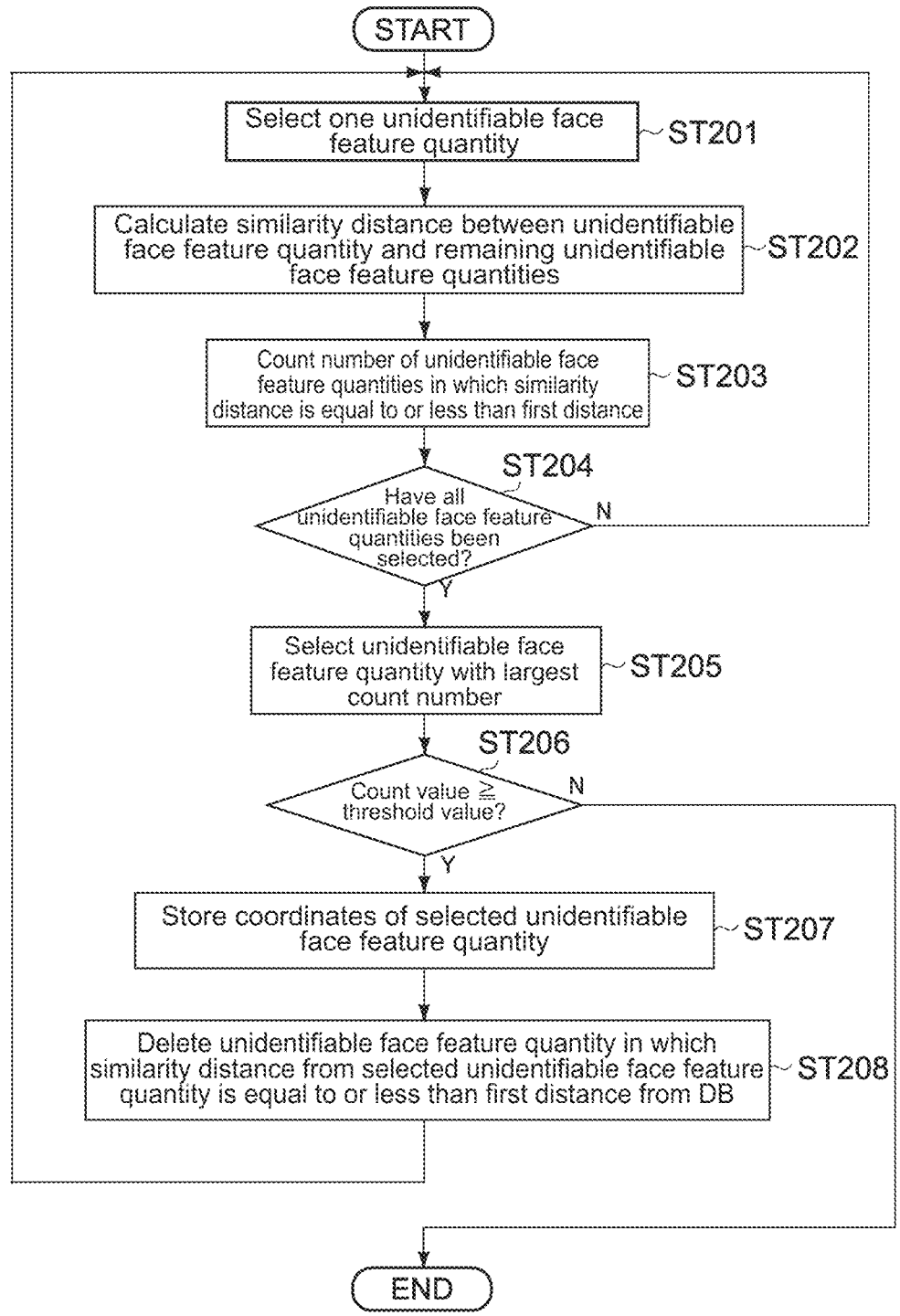
FIG. 5 is a flowchart illustrating a process of setting an additional registration face feature quantity.

An example will be described specifically. FIG. 5 is a flowchart illustrating the process of setting the additional registration face feature quantity.

First, the control unit 1 selects one unidentifiable face feature quantity from the unidentifiable face feature quantities stored in the unidentifiable feature quantity DB (step 201). Then, the control unit 1 calculates the similarity distance between the selected unidentifiable face feature quantity and all the unidentifiable face feature quantities other than the selected face feature quantity in the feature quantity space (step 202).

Then, the control unit 1 counts the number of unidentifiable face feature quantities whose similarity distance is equal to or less than a first distance D1 (step 203). In other words, the control unit 1 determines the number (density) of other unidentifiable face feature quantities present in a range of the first distance D1 or less with respect to a certain selected unidentifiable face feature quantity.

Then, the control unit 1 determines whether or not all the unidentifiable face features have already been selected (step 204). If there is an unselected unidentifiable face feature quantity (NO in step 204), the control unit 1 returns to step 201 and selects one unidentifiable face feature quantity from among the unselected unidentifiable face feature quantities.

On the other hand, if all the unidentifiable face features have already been selected (YES in step 204), the control unit 1 selects an unidentifiable face feature quantity with the largest count number (the highest density) (step 205).

Then, the control unit 1 determines whether or not the count number (density) is equal to or more than a predetermined threshold value (step 206). If the count number (density) is greater than or equal to the predetermined threshold value (YES in step 206), the control unit 1 sets the coordinates of the selected unidentifiable face feature quantity as the coordinates of the additional registration face feature quantity and causes the set coordinates to be stored in the storage unit 2 (step 207).

Then, the control unit 1 removes, from the unidentifiable feature quantity DB, the unidentifiable face feature quantity (including the selected unidentifiable face feature quantity) whose similarity distance from the selected unidentifiable face feature quantity is equal to or less than the first distance D1 (step 208), then the process returns to step 201, and the process starting from step 201 is executed again.

If the count number (density) is less than the predetermined threshold value in step 206, the control unit 1 ends the process.

Here, in steps 201 to 206, the control unit 1 specifies the area in which the unidentifiable face feature quantities are gathered on the basis of the distribution of the unidentifiable face feature quantities in the feature quantity space. The control unit 1 specifies the area in accordance with the density, and when the density is equal to or larger than a predetermined threshold value, the control unit 1 specifies the range of the first distance D1 or less from the certain unidentifiable face feature quantity as the area.

Note that the area is the area of the range in which the distance from the center (the additional registration face feature quantity) in the first feature distance space is the first distance D1. Further, in step 207, the control unit 1 sets the unidentifiable face feature quantity located at the center of the area as the additional registration face feature quantity.

Figure 6:
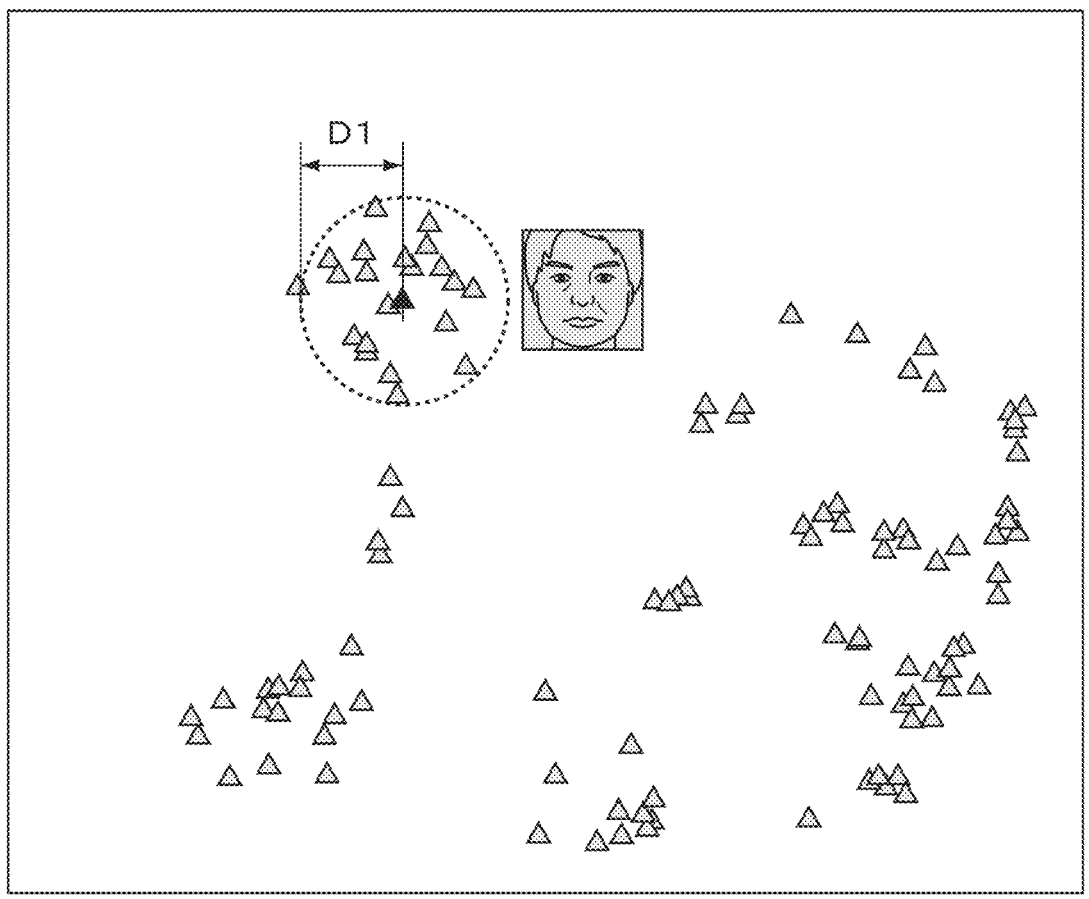
FIG. 6 is a diagram illustrating a state in which unidentifiable face feature quantities illustrated in FIGS. 3 and 4 are processed by the process illustrated in FIG. 5.
Figure 7:
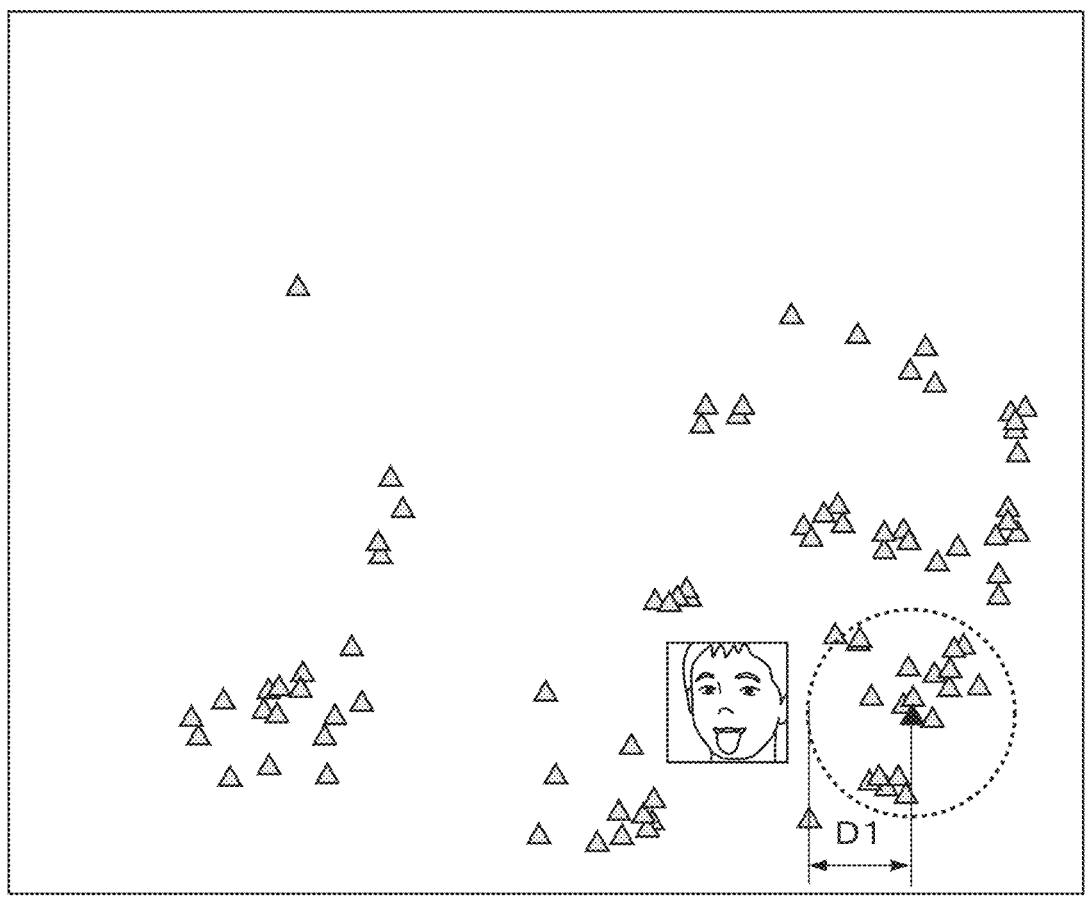
FIG. 7 is a diagram illustrating a state in which unidentifiable face feature quantities illustrated in FIGS. 3 and 4 are processed by the process illustrated in FIG. 5.
Figure 8:
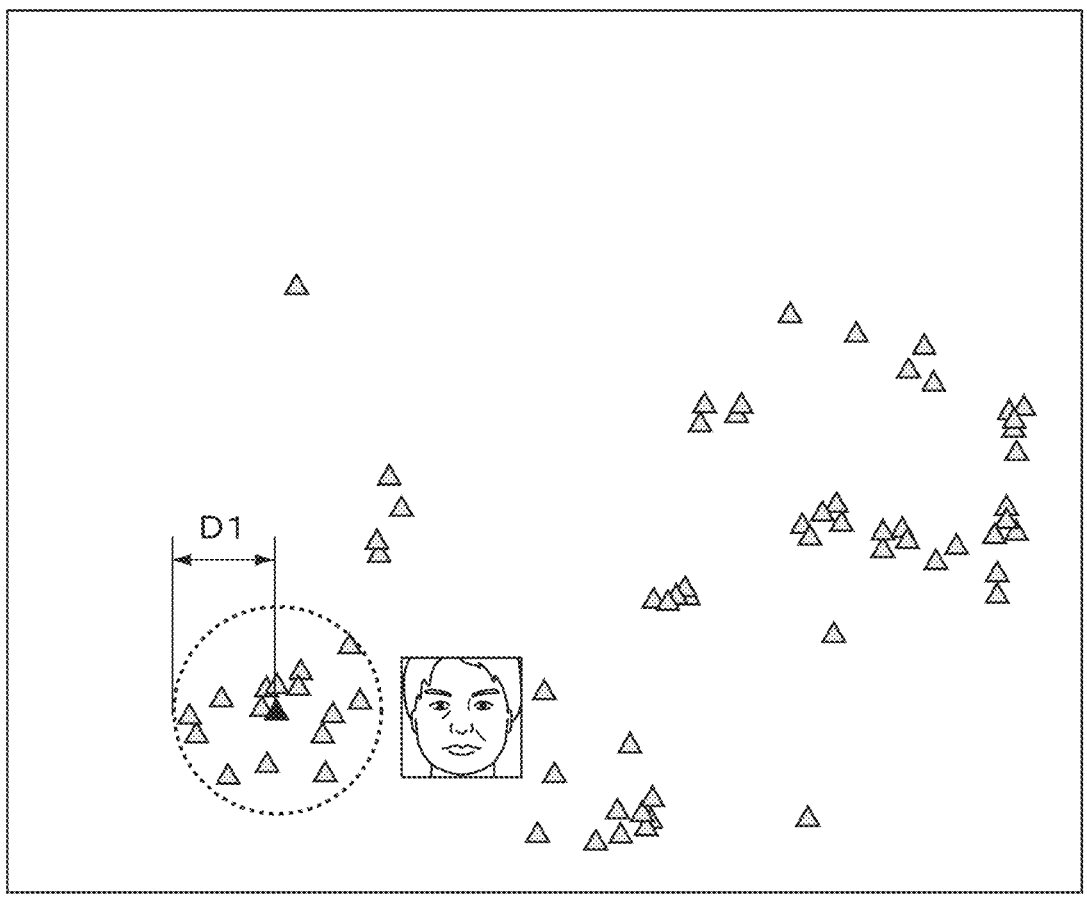
FIG. 8 is a diagram illustrating a state in which unidentifiable face feature quantities illustrated in FIGS. 3 and 4 are processed by the process illustrated in FIG. 5.

Next, how the unidentifiable face feature quantity illustrated in FIGS. 3 and 4 is processed by the process illustrated in FIG. 5 will be specifically described. FIGS. 6 to 8 are diagrams illustrating a state in which the unidentifiable face feature quantity illustrated in FIGS. 3 and 4 is processed by the process illustrated in FIG. 5.

Referring to FIG. 6, for all the unidentifiable face feature quantities (see gray Δ marks) illustrated in FIG. 6, the similarity distances between the unidentifiable face feature quantity and all the other unidentifiable face feature quantities are calculated, and the number of unidentifiable face feature quantities whose similarity distances are equal to or less than the first distance D1 is counted (step 201 to 204).

Then, the unidentifiable face feature quantity with the largest count number (density) is selected (step 205). At this time, it is assumed that among a plurality of unidentifiable face feature quantities corresponding to the father's dark face, one unidentifiable face feature quantity is selected as the unidentifiable face feature quantity with the largest count number. Then, it is assumed that the count number (density) is equal to or more than a predetermined threshold value (YES in step 206).

In this case, the area of the first distance D1 or less from the unidentifiable face feature quantity selected as having the largest count number (see the black Δ mark) is the area in which the unidentifiable face feature quantities are gathered (see ○ of a dashed line). Then, the unidentifiable face feature quantity (see the black Δ mark) selected as having the largest count number, that is, the unidentifiable face feature quantity located at the center of the area is set as the additional registration face feature quantity (step 207).

Accordingly, the area in which the unidentifiable face feature quantity corresponding to the father's dark face is gathered is specified, and the additional registration face feature quantity is set at the center of this area.

If the additional registration face feature quantity is set, the face feature quantity located in the area, that is, the unidentifiable face feature quantity corresponding to the father's dark face is deleted from the unidentifiable feature quantity DB (step 208). Then, the process starting from step 201 is executed again.

Referring to FIG. 7, in FIG. 7, the unidentifiable face feature quantity corresponding to the father's dark face has already been deleted. Therefore, for all the remaining unidentifiable face feature quantities (see the gray Δ marks), the similarity distances between the unidentifiable face feature quantity and all the other unidentifiable face feature quantities are calculated, and the number of unidentifiable face feature quantities in which the similarity distance is the first distance D1 is counted (steps 201 to 204).

Then, the unidentifiable face feature quantity with the largest count number (density) is selected (step 205). At this time, it is assumed that one unidentifiable face feature quantity among a plurality of unidentifiable face feature quantities corresponding to the face of the third son is selected as the unidentifiable face feature quantity with the largest count number. Then, it is assumed that the count number (density) is equal to or more than a predetermined threshold value (YES in step 206).

In this case, the area of the first distance D1 or less from the unidentifiable face feature quantity selected as having the largest count number (see the black Δ mark) is the area in which the unidentifiable face feature quantities are gathered (see ○ of a dashed line). Then, the unidentifiable face feature quantity (see the black Δ mark) selected as having the largest count number, that is, the unidentifiable face feature quantity located at the center of the area is set as the additional registration face feature quantity (step 207).

Accordingly, the area in which the unidentifiable face feature quantity corresponding to the face of the third son when the change in the facial expression is large is specified, and the additional registration face feature quantity is set at the center of the area.

If the additional registration face feature quantity is set, the face feature quantity located in the area, that is, the unidentifiable face feature quantity corresponding to the face of the third son when the change in the facial expression is large is deleted from the unidentifiable feature quantity DB (step 208). Then, the process starting from step 201 is executed again.

Referring to FIG. 8, in FIG. 8, the unidentifiable face feature quantity corresponding to the father's dark face and the unidentifiable face feature quantity corresponding to the third son's face when the change in the facial expression is large have already been deleted. Therefore, for all the remaining unidentifiable face feature quantities (see the gray Δ marks), the similarity distances between the unidentifiable face feature quantity and all the other unidentifiable face feature quantities are calculated, and the number of unidentifiable face feature quantities in which the similarity distance is the first distance D1 is counted (steps 201 to 204).

Then, the unidentifiable face feature quantity with the largest count number (density) is selected (step 205). At this time, it is assumed that one unidentifiable face feature quantity among a plurality of unidentifiable face feature quantities corresponding to the father's bright face is selected as the largest unidentifiable face feature quantity with the largest count number. Then, it is assumed that the count number (density) is equal to or more than a predetermined threshold value (YES in step 206).

In this case, the area of the first distance D1 or less from the unidentifiable face feature quantity selected as having the largest count number (see the black Δ mark) is the area in which the unidentifiable face feature quantities are gathered (see ○ of a dashed line). Then, the unidentifiable face feature quantity (see the black Δ mark) selected as having the largest count number, that is, the unidentifiable face feature quantity located at the center of the area is set as the additional registration face feature quantity (step 207).

Accordingly, the area in which the unidentifiable face feature quantity corresponding to the father's bright face is gathered is identified, and the additional registration face feature quantity is set at the center of the area.

If the additional registration face feature quantity is set, the face feature quantity located in the area, that is, the unidentifiable face feature quantity corresponding to the father's bright face is deleted from the unidentifiable feature quantity DB (step 208).

Then, if the process after step 201 is executed again and the count number is less than a predetermined threshold value (NO in step 206), that is, there is no area in which the density of the unidentifiable face feature quantity is equal to or larger than a predetermined threshold value, the process ends.

Here, for example, in a case in which a face of a contractor of an electrical work, a water work, or the like, a face of a friend who came to play, a face shown in a television is imaged by the imaging unit 3, in a case in which an erroneous face detection is performed, or the like, the face feature quantities corresponding to these faces may be stored in the unidentifiable feature quantity DB as the unidentifiable face feature quantity. On the other hand, since such an unidentifiable face feature quantities are low in the density in the distribution of the unidentifiable face feature quantities (NO in step 206), such an additional registration face feature quantity corresponding to the unidentifiable face feature quantity is not generated.

In the above description, the flowchart illustrated in FIG. 5 has been described as the example of the method of specifying the area in which the unidentifiable face feature quantities are gathered in the feature quantity space and setting the additional registration face feature quantity in the area. On the other hand, the method is not limited to the example illustrated in FIG. 5. Typically, any method can be used as long as it is a method capable of specifying the area in which unidentifiable face feature quantities are gathered and setting the additional registration face feature quantity in the area.

For example, a general clustering technology may be used to specify the area in which unidentifiable face feature quantities are aggregated, and the additional registration face feature quantity may be set at a cluster center.

Note that the process illustrated in FIG. 5 may be executed when it is in an idle state in which the other processes are not executed since a processing load is also predicted to be heavy.

(3) "Process of Additionally Registering Additional Registration Face Feature Quantity"

Next, the process of additionally registering the additional registration face feature quantity will be described.

In brief, in this process, first, in order to specify the user corresponding to the additional registration face feature quantity, it is determined whether or not an interaction with the user is started. Then, in a case in which it is determined that the interaction is started, the interaction with the user via the speaker 5 and the microphone 6 is performed, and the user corresponding to the additional registration face feature quantity is specified. Then, the additional registration face feature quantity is additionally registered as the face feature quantity of the specified user.

Figure 9:
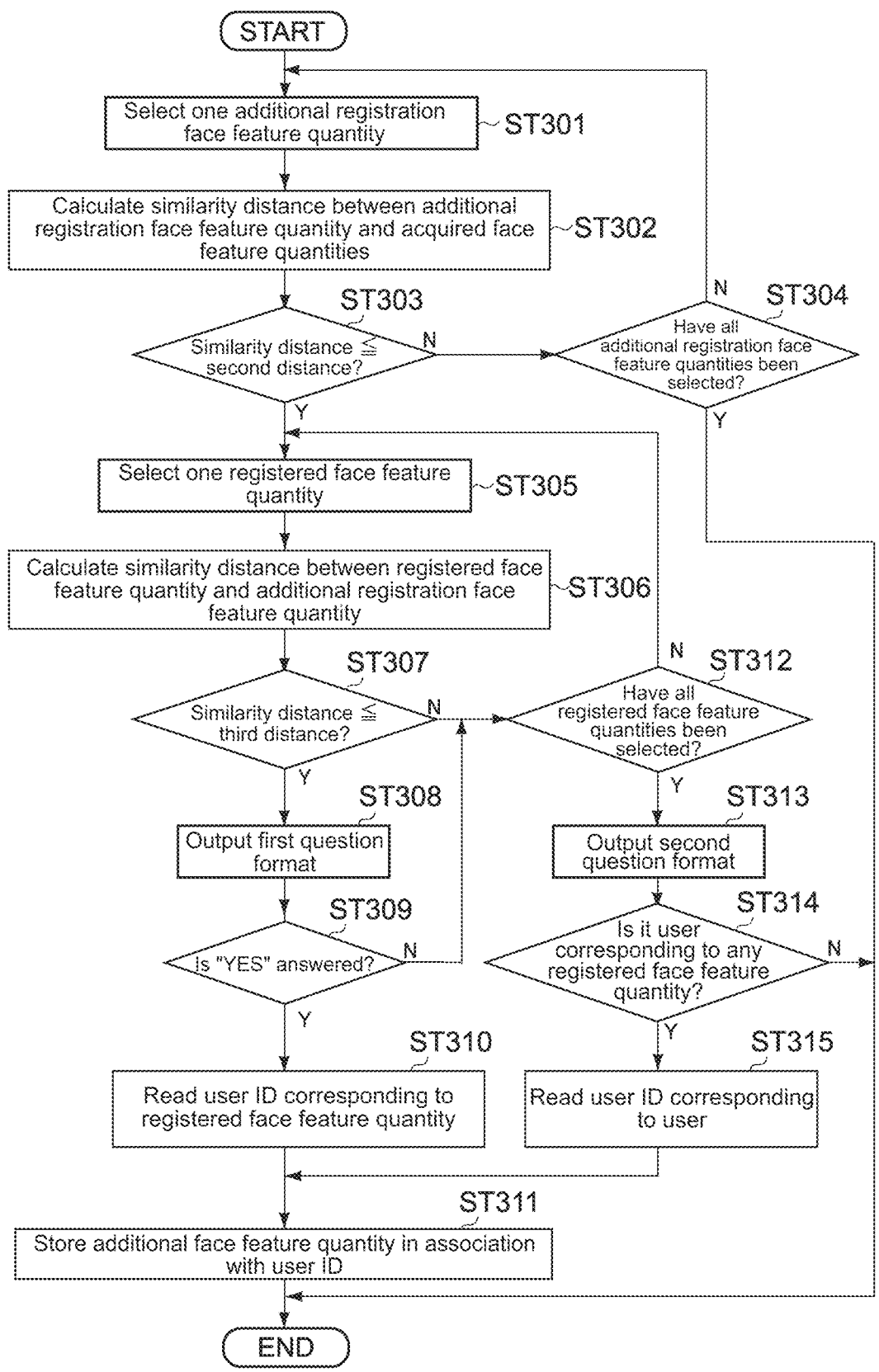
FIG. 9 is a flowchart illustrating a process of additionally registering an additional registration face feature quantity.

An example will be specifically described below. FIG. 9 is a flowchart illustrating the process of additionally registering the additional registration face feature quantity.

First, the control unit 1 selects one additional registration face feature quantity from the additional registration face feature quantities stored in the storage unit (step 301). At this time, for example, the control unit 1 selects one additional registration face feature quantity from the additional registration face feature quantities (see the black Δ marks) illustrated in FIGS. 6 to 8.

Then, the control unit 1 calculates the similarity distance between the selected additional registration face feature quantity and the face feature quantity acquired at that time (step 302).

Then, the control unit 1 determines whether or not the similarity distance is equal to or less than a second distance D2 (step 303). If the similarity distance exceeds the second distance D2 (NO in step 303), the control unit 1 determines whether or not all the additional registration face feature quantities have already been selected (step 304).

If there is an unselected additional registration face feature quantity (NO in step 304), the control unit 1 returns to step 301 and selects one additional registration face feature quantity which is not selected yet.

On the other hand, if all the additional registration face feature quantities have already been selected (YES in step 304), the control unit 1 ends the process. In other words, if the face feature quantity acquired at that time exceeds the second distance D2 with respect to (is not similar to) any additional registration face feature quantity, the control unit 1 ends the process without executing the process of additionally registering the additional registration face feature quantity (without starting the interaction).

If the similarity distance is equal to or less than the second distance D2 in step 303 (YES in step 303), that is, the face feature quantity acquired at that time is within a range of the second distance D2 or less with respect to (is similar to) a certain specific additional registration face feature quantity, the control unit 1 proceeds to next step 305. In step 305 and subsequent steps, the process of performing the interaction with the user is executed.

Here, in step 301 to 304, the control unit 1 determines whether or not the interaction with the user is started in order to specify the user corresponding to the additional registration face feature quantity. At this time, the control unit 1 determines whether or not the interaction is started on the basis of the similarity distance between the selected additional registration face feature quantity and the face feature quantity acquired at that time. Further, the control unit 1 starts the interaction when the similarity distance is equal to or less than the second distance D2 (YES in step 303).

Figure 10:
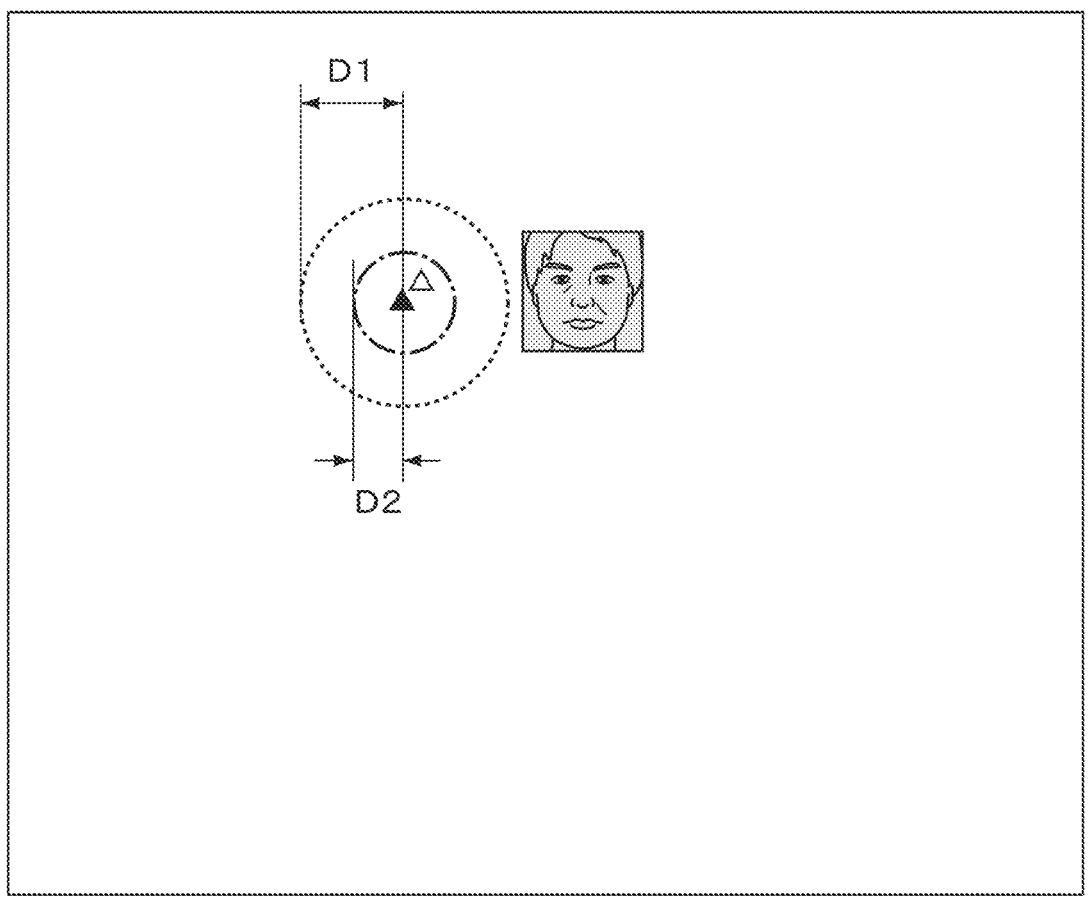
FIG. 10 is a diagram illustrating an example in which a similarity distance between an additional registration face feature quantity and a face feature quantity acquired at that time in a feature quantity space is equal to or less than a second distance.

FIG. 10 is a diagram illustrating an example in a case in which the similarity distance between the additional registration face feature quantity and the face feature quantity acquired at that time in the feature quantity space is equal to or less than the second distance D2.

In FIG. 10, a black Δ mark indicates the additional registration face feature quantity corresponding to the father's dark face, and a white Δ mark indicates the face feature quantity acquired at that time. Further, a ○ of a dashed line indicates a range of the first distance D1 or less from the additional registration face feature quantity (an area in which the unidentifiable face feature quantities are determined to be gathered). Further, a ○ of an alternate long and short dash line indicates a range of the second distance D2 or less from the additional registration face feature quantity (a range reserving as a reference of whether or not an interaction is started).

As illustrated in FIG. 10, for example, the face of the father is dark at the present, and in a case in which the face feature quantity (the white Δ mark) acquired at that time is within the second distance D2 from the additional registration face feature quantity (the black Δ mark) corresponding to the father's dark face, the interaction with the user is started.

FIG. 10 also illustrates a relation between the first distance D1 and the second distance D2. As illustrated in FIG. 10, in the present embodiment, the second distance D2 is a distance equal to or less than the first distance D1. In other words, in the present embodiment, in a case in which the acquired face feature quantity (the white Δ mark) is sufficiently close to the additional registration face feature quantity (the black Δ mark), the interaction with the user is started.

Returning to FIG. 9, in step 303, in a case in which the similarity distance is equal to or less than the second distance D2 (YES in step 303), the control unit 1 selects one registered feature quantity from the registered feature quantities stored in the storage unit 2 (step 305). Then, the control unit 1 calculates the similarity distance between the registered feature quantity and the additional registration face feature (step 306).

Then, the control unit 1 determines whether or not the similarity distance is equal to or less than a third distance D3 (step 307). If the similarity distance is less than (is similar to) the third distance D3 (YES in step 307), the control unit 1 causes a voice of a question (an example of a conversation) in a first question format to be output from the speaker 5 and performs an interaction with the user (step 308).

The first question format is a question format for asking the user whether or not it is a user corresponding to the registered feature quantity. For example, if the similarity distance between the registered feature quantity of the father and the additional registration face feature quantity is equal to or less than the third distance D3, for example, the control unit 1 asks a question "Are you Mr. . . . (the name of the father)?" through the speaker 5. Further, for example, if the similarity distance between the registered feature quantity of the third son and the additional registration face feature quantity is equal to or less than the third distance D3, for example, the control unit 1 asks a question "Are you Mr. . . . (the name of the third son)?."

Then, the control unit 1 acquires information of the voice spoken by the user from the microphone 6 and determines whether or not the user makes an affirmative answer such as "Yes" or "That is correct" to the voice of the question (step 309).

If the user makes an affirmative answer such as "Yes" (YES in step 309), the control unit 1 reads a user ID corresponding to the registered feature quantity (the registered feature quantity in which the similarity distance from the additional registration face feature quantity is within the third distance D3) from the storage unit 2 (step 310).

Then, the control unit 1 stores the additional registration face feature quantity in the storage unit 2 in association with the user ID (step 311). The additional registration face feature quantity associated with the user ID is used in the face identification process described in Section [Basic process] described above as the registered feature quantity.

If the similarity distance between the registered feature quantity and the face feature for additional registration exceeds the third distance D3 in step 307 (NO in step 307), the control unit 1 proceeds to next step 312. Similarly, if the user makes a negative answer such as "No" or "That is not correct" to the voice of the question in step 309 (NO in step 309), the control unit 1 proceeds to next step 312.

In step 312, the control unit 1 determines whether or not all the registered feature quantities have already been selected. If there is an unselected registered feature quantity (NO in step 312), the control unit 1 returns to step 305 and select one additional registration face feature quantity which is not selected yet.

On the other hand, when all the additional registration face feature quantities have already been selected (YES in step 312), the control unit 1 causes a voice of a question in a second question format to be output from the speaker 5 and performs an interaction with the user (step 313).

The second question format is a question format for asking the user to answer the name of the user. For example, the control unit 1 asks a question "Can you let me know your name?" through the speaker 5.

In other words, the control unit 1 is capable of changing the question format in the voice of the question in accordance with the similarity distance between the registered feature quantity and the additional registration face feature quantity.

Then, the control unit 1 acquires information of the voice spoken by the user from the microphone 6 and determines whether or not the name answered by the user is the user corresponding to any registered feature quantity (step 314).

If the name answered by the user is the name of the user that does not correspond to any registered feature quantity (NO in step 314), the control unit 1 ends the process.

On the other hand, if the name answered by the user is the name of the user corresponding to any registered feature quantity (YES in step 314), the control unit 1 reads the user ID of the user from the storage unit 2 (step 315). Then, the control unit 1 stores the additional registration face feature quantity in the storage unit 2 in association with the user ID (step 311).

As described above, the control unit 1 performs the interaction with the user, specifies the user corresponding to the additional registration face feature quantity, and registers additionally the additional registration face feature quantity as the face feature quantity of the specified user sequentially.

Note that if the name of the user answered to the question "Can you let me know your name?" is the name of the user that does not correspond to any registered feature quantity (NO in step 314), the control unit 1 may perform a process of registering a new user.

Here, a case in which the name of the user answered to the question "Can you let me know your name?" is the name of the user that does not correspond to any registered feature quantity will be described. When the control unit 1 makes a question, it means that there is an additional registration face feature quantity in which a corresponding user is not known. The additional registration face feature quantity is generated unless someone stays at a relatively high frequency, for example, in the installation place of the home agent apparatus 10 such as the living room or the dining room.

In other words, it indicates that someone is staying in the installation place of the home agent apparatus 10 at a high frequency, but it does not correspond to any registered user. Such a situation is likely to occur when there is a family member who is not registered yet, when there is a person with very high intimacy with the family. Therefore, in such a case, the control unit 1 may execute the process of registering the additional registration face feature quantity as the face feature quantity of the new user.

In this case, for example, the control unit 1 causes a voice of a question "Do you want to perform new registration?" to be output from the speaker 5, and registers the additional registration face feature quantity as the face feature quantity of the new user if there is an affirmative answer such as "Yes" to the question.

The example in which the control unit 1 performs the interaction with the user by outputting the voice of the question to the user from the speaker 5 and specifies the user corresponding to the additional registration face feature quantity has been described above. On the other hand, the control unit 1 may perform the interaction with the user by outputting a voice of a conversation such as "Hello, how are you?" from the speaker 5 and specify the user corresponding to the additional registration face feature quantity.

In this case, for example, the user is assumed to make an answer "Hello," "I'm fine" or the like to the voice of the conversation "Hello," "How are you?" output from the speaker 5. In this case, the control unit 1 acquires information of the voice of the user such as "Hello," "I'm fine" from the microphone 6, executes speaker recognition, and specifies the user corresponding to the additional registration face feature quantity.

Further, the following methods can be used as another method of specifying the user corresponding to the additional registration face feature quantity. First, the control unit 1 performs a process of identifying the face of the user in an image captured by the imaging unit 3, causes the voice such as "Hello" to be output from the speaker 5 when an angle of the face of the user is large, and causes the face of the user to turn to the imaging unit 3. Alternatively, the control unit 1 adjusts a projection direction by projecting unit 4 and causes the face of the user to turn to the imaging unit 3. Then, when the angle of the face of the user in the image captured by the imaging unit 3 becomes close to the front, the control unit 1 performs the process of identifying the face again and identifies who the user is.

<<Operation or the Like>>

In the present embodiment, the additional registration face feature quantity is set on the basis of the distribution of the unidentifiable face feature quantities. As the additional registration face feature quantity is set on the basis of the unidentifiable distribution, it is possible to set the additional registration face feature quantity appropriate for improving the face identification accuracy for the user (see FIG. 5 and FIGS. 6 to 8). As a result, the face identification accuracy for the user can be improved.

Further, in the present embodiment, since the additional registration face feature quantity is set on the basis of the distribution of the unidentifiable face feature quantities, the face feature quantity can be set the additional registration face feature quantity even though the face feature quantity is spaced apart from the registered feature quantity (see FIGS. 5 and 6 to 8).

Here, a case in which the face of the user is frequently not identified is assumed as a comparison. In this case, it is necessary for the user to predict a cause (for example, whether the face is bright and dark) and to additionally register the face of the user (for example, the face when bright or dark) on the basis of the predicted cause.

On the other hand, in the present embodiment, the additional registration face feature quantity is automatically generated by the control unit 1 (see FIG. 5 and FIGS. 6 to 8). Therefore, in the present embodiment, the user need not predict what kind of face should be additionally registered or need not additionally register the face of the user on the basis of the predicted cause.

Further, in the present embodiment, the area in which the unidentifiable face feature quantities are gathered in the feature quantity space is specified on the basis of the distribution of the unidentifiable face feature quantities, and the additional registration face feature quantity is set in the area (see FIG. 5 and FIGS. 6 to 8). Accordingly, it is possible to set the additional registration face feature quantity which is more suitable for improving the identification accuracy for the user.

Further, in the present embodiment, the density of the unidentifiable face feature quantities in the distribution of the unidentifiable face feature quantities is specified, the area is specified in accordance with the density, and the additional registration face feature quantity is set in the area (see FIG. 5 and FIGS. 6 to 8).

Accordingly, it is possible to prevent the additional registration face feature quantity for an inappropriate person (for example, a contractor of an electric work) who should not be additionally registered from being set while appropriately setting the additional registration face feature quantity for an appropriate person (for example, a family member) who should be additionally registered.

Further, in the present embodiment, the interaction with the user is performed, the user corresponding to the additional registration face feature quantity is specified, and the additional registration face feature quantity is additionally registered as the face feature quantity of the specified user. (See FIG. 9). Accordingly, the user can additionally register the additional registration face feature quantity as the face feature quantity of the user only by performing a simple short interaction with the home agent apparatus 10. Therefore, it is possible to prevent the user from being forced to perform complicated work at the time of additional registration.

Note that, in the present embodiment, if the additional registration face feature quantity is additionally registered, the unidentifiable face feature quantity decreases sequentially, and the additional registration face feature quantity set on the basis of the distribution of the unidentifiable face feature quantities also decreases gradually. Therefore, the interaction with the user for specifying the user corresponding to the additional registration face feature quantity also decreases sequentially. Therefore, in the present embodiment, the number of interactions with the user is small.

Further, in the present embodiment, it is determined whether or not the interaction with the user is started on the basis of the similarity distance between the additional registration face feature quantity and the acquired face feature quantity of the user (see FIG. 9). Accordingly, it is possible to cause the interaction with the user to be started at an appropriate timing.

Further, in the present embodiment, when the similarity distance between the additional registration face feature quantity and the acquired face feature quantity of the user is equal to or less than the second distance D2, the interaction with the user is started. Then, the second distance D2 is equal to or less than the first distance D1 (see FIG. 10). In other words, in the present embodiment, when the acquired face feature quantity is sufficiently close to the additional registration face feature quantity, the interaction with the user is started. Accordingly, it is possible to prevent the additional registration face feature quantity from being erroneously additionally registered as the face feature quantity of the wrong user.

Further, in the present embodiment, the voice of the question for the user is output from the speaker 5, and the interaction with the user is performed. Therefore, the user can additionally register the additional registration face feature quantity as the face feature quantity of the user only by answering to the question.

Further, in the present embodiment, the question format is changed in accordance with the similarity distance between the additional registration face feature quantity and the registered feature quantity (see FIG. 9). Therefore, in the present embodiment, it is possible to ask the user a question in an appropriate question format.

Specifically, in the present embodiment, when the similarity distance between the additional registration face feature quantity and the registered feature quantity is equal to or less than the third distance D3, the question in the first question format such as "Are you Mr. . . . ?" is made. On the other hand, if the similarity distance exceeds the third distance D3, the question in the second question format such as "Can you let me know your name?" is made. As described above, in the present embodiment, it is possible to ask the user a question in an appropriate question format in accordance with the similarity distance between the additional registration face feature quantity and the registered feature quantity.

Further, the additional registration face feature quantity can be additionally registered, for example, as a face feature quantity of a family member who has not yet registered in the case of the form in which it is registered as the face feature quantity of the new user.

Further, even in the form in which the speaker recognition is executed on the basis of the voice of the answer of the user such as "Hello," the user can additionally register the additional registration face feature quantity as the face feature quantity of the user only by performing the simple short interaction with the home agent apparatus 10.

Various Modified Examples

The example in which the feature quantity is the feature quantity of the face of user has been described above. On the other hand, this feature quantity may be any feature quantity as long as it is a feature quantity acquired from the whole or a part of the body of the user.

The example in which the imaging unit 3 is installed in the home agent apparatus 10 has been described above, but the imaging unit 3 may be distinct from the home agent apparatus 10.

In the above description, the home agent apparatus 10 has been described as an example of an information processing apparatus, but the information processing apparatus is not limited to the home agent apparatus 10. Typically, the present technology can be executed by any apparatus as long as the imaging unit 3 is disposed under an environment in which a person to be photographed or an imaging condition is fixed to a certain extend such as in a house, an office, or a vehicle.

For example, a server apparatus on a network may also execute the above-described processes on the basis of the image captured by the imaging unit 3 under the above environment. Further, the process may be shared and executed by two or more apparatus.

The present technology can also have the following configurations.

(1) An information processing apparatus, including:
a control unit that causes, when a user is unable to be identified by identification in a feature quantity space based on a registered feature quantity and an acquired feature quantity of the user, the acquired feature quantity of the user to be stored in a storage unit as an unidentifiable feature quantity, sets an additional registration feature quantity on the basis of a distribution of unidentifiable feature quantities in the feature quantity space, specifies a user corresponding to the additional registration feature quantity, and additionally registers the additional registration feature quantity as a feature quantity of the specified user.

(2) The information processing apparatus according to (1), in which
the control unit specifies an area in which the unidentifiable feature quantities are gathered in the feature quantity space on the basis of the distribution, and sets the additional registration feature quantity in the area.

(3) The information processing apparatus according to (1) or (2), in which
the control unit performs an interaction with the user and specifies the user corresponding to the additional registration feature quantity.

(4) The information processing apparatus according to (2), in which
the control unit determines a density of the unidentifiable feature quantity in the feature quantity space, and specifies the area in accordance with the density.

(5) The information processing apparatus according to (4), in which
the control unit determines, as the density, the number of other unidentifiable feature quantities located in a range within a first distance with respect to a certain specific unidentifiable feature quantity.

(6) The information processing apparatus according to (5), in which
the control unit specifies the range within the first distance from the certain specific unidentifiable feature quantity if the density is equal to or larger than a predetermined threshold value.

(7) The information processing apparatus according to (6), in which
the control unit sets the certain specific unidentifiable feature quantity as the additional registration feature quantity.

(8) The information processing apparatus according to (3), in which
the control unit determines whether or not the interaction is started on the basis of a distance between the additional registration feature quantity and the acquired feature quantity of the user.

(9) The information processing apparatus according to (8), in which
the control unit starts the interaction if the distance between the additional registration feature quantity and the acquired feature quantity of the user is equal to or less than a second distance.

(10) The information processing apparatus according to (9), in which
the control unit specifies an area in which the unidentifiable feature quantities are gathered in the feature quantity space on the basis of the distribution and sets the additional registration feature quantity in the area,
the area is a range in which a distance from the additional registration feature quantity is within a first distance, and
the second distance is equal to or less than the first distance.

(11) The information processing apparatus according to (3), in which
the control unit causes a voice of a conversation with the user to be output from an audio output unit and interacts with the user.

(12) The information processing apparatus according to (11), in which
the control unit causes a voice of a question for the user to be output from the audio output unit and performs the interaction with the user.

(13) The information processing apparatus according to (12), in which
the control unit is able to change a question format in the voice of the question.

(14) The information processing apparatus according to (13), in which
the control unit changes the question format in accordance with a distance between the additional registration feature quantity and the registered feature quantity.

(15) The information processing apparatus according to (14), in which
the control unit determines whether or not the distance between the additional registration feature quantity and the registered feature quantity is equal to or less than a third distance, and causes a voice in a first question format for asking the user if the user is the user corresponding to the registered feature quantity to be output from the audio output unit if the distance is equal to or less than the third distance.

(16) The information processing apparatus according to (15), in which
the control unit causes a voice in a second question format for asking the user to answer a name of the user to be output from the audio output unit if the distance exceeds the third distance.

(17) The information processing apparatus according to (16), in which
the control unit determines whether or not the name answered by the user is the user corresponding to the registered feature quantity, and registers the additional registration feature quantity as a feature quantity of a new user if the name answered by the user is not the user corresponding to the registered feature quantity.

(18) The information processing apparatus according to (11), in which
the control unit acquires information of a voice of the user answered to the voice of the conversation output from the audio output unit, executes speaker recognition on the basis of the information of the voice of the user, and specifies the user.

(19) An information processing method, including:
causing, when a user is unable to be identified by identification in a feature quantity space based on a registered feature quantity and an acquired feature quantity of the user, the acquired feature quantity of the user to be stored in a storage unit as an unidentifiable feature quantity;
setting an additional registration feature quantity on the basis of a distribution of unidentifiable feature quantities in the feature quantity space;
specifying a user corresponding to the additional registration feature quantity; and
additionally registering the additional registration feature quantity as a feature quantity of the specified user.

(20) A program causing a computer to execute:
a step of causing, when a user is unable to be identified by identification in a feature quantity space based on a registered feature quantity and an acquired feature quantity of the user, the acquired feature quantity of the user to be stored in a storage unit as an unidentifiable feature quantity;
a step of setting an additional registration feature quantity on the basis of a distribution of unidentifiable feature quantities in the feature quantity space;
a step of specifying a user corresponding to the additional registration feature quantity; and
a step of additionally registering the additional registration feature quantity as a feature quantity of the specified user.

REFERENCE SIGNS LIST 1 control unit
2 storage unit
3 imaging unit
4 projecting unit
5 speaker
6 microphone
7 communication unit
10 home agent apparatus

The invention claimed is:

1. An information processing apparatus, comprising:
a control unit configured to:
acquire a feature quantity from a face image of a user, wherein the acquired feature quantity corresponds to a multi-dimensional face feature quantity vector of a face feature position of the face image of the user;
control, when the user is unable to be identified in a feature quantity space based on a registered feature quantity of a registered user and the acquired feature quantity of the user, storage of the acquired feature quantity of the user in a storage unit as an unidentifiable feature quantity of a plurality of unidentifiable feature quantities in the feature quantity space, wherein the registered feature quantity corresponds to a multi-dimensional face feature quantity vector of a face feature position of a registered image of the registered user;
set an additional registration feature quantity based on a distribution of the plurality of unidentifiable feature quantities in the feature quantity space, wherein
the plurality of unidentifiable feature quantities comprises a specific unidentifiable feature quantity, and unidentifiable feature quantities within a first distance from the specific unidentifiable feature quantity, and
the specific unidentifiable feature quantity is set as the additional registration feature quantity, based on removal of the unidentifiable feature quantities within the first distance from the specific unidentifiable feature quantity;
determine a start of interaction with the user based on a second distance between the additional registration feature quantity and the acquired feature quantity of the user;
specify the user corresponding to the additional registration feature quantity based on the interaction with the user; and
register the additional registration feature quantity as a feature quantity of the user.

2. The information processing apparatus according to claim 1, wherein the control unit is further configured to:
determine an area in which the plurality of unidentifiable feature quantities is gathered in the feature quantity space, wherein the area is determined based on the distribution; and
set the additional registration feature quantity in the determined area.

3. The information processing apparatus according to claim 1, wherein the control unit is further configured to execute the interaction with the user.

4. The information processing apparatus according to claim 2, wherein the control unit is further configured to:
determine a density of the unidentifiable feature quantity in the feature quantity space; and
determine the area based on the determined density.

5. The information processing apparatus according to claim 4, wherein
the control unit is further configured to determine, as the density, a set of unidentifiable feature quantities of the plurality of unidentifiable feature quantities, and
the set of unidentifiable feature quantities is within the first distance from the specific unidentifiable feature quantity of the plurality of unidentifiable feature quantities.

6. The information processing apparatus according to claim 5, wherein the control unit is further configured to determine a range within the first distance from the specific unidentifiable feature quantity based on the density that is equal to or greater than a specific threshold value.

7. The information processing apparatus according to claim 6, wherein the control unit is further configured to set the specific unidentifiable feature quantity as the additional registration feature quantity.

8. The information processing apparatus according to claim 1, wherein the control unit is further configured to:
determine an area in which the plurality of unidentifiable feature quantities is gathered in the feature quantity space, wherein the area is determined based on the distribution; and
set the additional registration feature quantity in the determined area, wherein the determined area is a range in which a distance from the additional registration feature quantity is within the first distance.

9. The information processing apparatus according to claim 3, wherein the control unit is further configured to:
control output of a voice from an audio output unit; and
execute the interaction with the user based on the output of the voice.

10. The information processing apparatus according to claim 9, wherein the voice includes a question for the user.

11. The information processing apparatus according to claim 10, wherein the control unit is further configured to change a question format of the question.

12. The information processing apparatus according to claim 11, wherein the control unit is further configured to change the question format based on a distance between the additional registration feature quantity and the registered feature quantity.

13. The information processing apparatus according to claim 12, wherein the control unit is further configured to:
determine the distance between the additional registration feature quantity and the registered feature quantity is equal to or less than a third distance; and
control, based on the distance between the additional registration feature quantity and the registered feature quantity is equal to or less than the third distance, output of the voice in a first question format to ask the user if the user is the registered user corresponding to the registered feature quantity.

14. The information processing apparatus according to claim 13, wherein the control unit is further configured to control, based on the distance that exceeds the third distance, output of the voice in a second question format to ask the user to answer a name of the user.

15. The information processing apparatus according to claim 14, wherein the control unit is further configured to:
determine the name answered by the user; and
register the additional registration feature quantity as a feature quantity of a new user based on the name answered by the user is not the registered user corresponding to the registered feature quantity.

16. The information processing apparatus according to claim 9, wherein the control unit is further configured to:
acquire information of the voice of the user answered to the output from the audio output unit; and
execute speaker recognition based on the information of the voice of the user.

17. An information processing method, comprising:
acquiring a feature quantity from a face image of a user, wherein the acquired feature quantity corresponds to a multi-dimensional face feature quantity vector of a face feature position of the face image of the user;
controlling, when the user is unable to be identified in a feature quantity space based on a registered feature quantity of a registered user and the acquired feature quantity of the user, storage of the acquired feature quantity of the user in a storage unit as an unidentifiable feature quantity of a plurality of unidentifiable feature quantities in the feature quantity space, wherein the registered feature quantity corresponds to a multi-dimensional face feature quantity vector of a face feature position of a registered image of the registered user;
setting an additional registration feature quantity based on a distribution of the plurality of unidentifiable feature quantities in the feature quantity space, wherein
the plurality of unidentifiable feature quantities comprises a specific unidentifiable feature quantity, and unidentifiable feature quantities within a first distance from the specific unidentifiable feature quantity, and
the specific unidentifiable feature quantity is set as the additional registration feature quantity, based on removal of the unidentifiable feature quantities within the first distance from the specific unidentifiable feature quantity;
determining a start of interaction with the user based on a second distance between the additional registration feature quantity and the acquired feature quantity of the user;
specifying the user corresponding to the additional registration feature quantity based on the interaction with the user; and
registering the additional registration feature quantity as a feature quantity of the user.

18. A non-transitory computer-readable medium having stored thereon computer-executable instructions which, when executed by a processor, cause the processor to execute operations, the operations comprising:
acquiring a feature quantity from a face image of a user, wherein the acquired feature quantity corresponds to a multi-dimensional face feature quantity vector of a face feature position of the face image of the user;
controlling, when the user is unable to be identified in a feature quantity space based on a registered feature quantity of a registered user and the acquired feature quantity of the user, storage of the acquired feature quantity of the user in a storage unit as an unidentifiable feature quantity of a plurality of unidentifiable feature quantities in the feature quantity space, wherein the registered feature quantity corresponds to a multi-dimensional face feature quantity vector of a face feature position of a registered image of the registered user;
setting an additional registration feature quantity based on a distribution of the plurality of unidentifiable feature quantities in the feature quantity space, wherein
the plurality of unidentifiable feature quantities comprises a specific unidentifiable feature quantity, and unidentifiable feature quantities within a first distance from the specific unidentifiable feature quantity, and
the specific unidentifiable feature quantity is set as the additional registration feature quantity, based on removal of the unidentifiable feature quantities within the first distance from the specific unidentifiable feature quantity;
determining a start of interaction with the user based on a second distance between the additional registration feature quantity and the acquired feature quantity of the user;
specifying the user corresponding to the additional registration feature quantity based on the interaction with the user; and registering the additional registration feature quantity as a feature quantity of the user.

* * * * *